US 6,652,457 B1

(12) United States Patent
Skiba et al.

(10) Patent No.: US 6,652,457 B1
(45) Date of Patent: Nov. 25, 2003

(54) STIMULUS-RESPONSE CONDITIONING PROCESS

(76) Inventors: Gary L. Skiba, 3 Dinglebrook La., Newtown, CT (US) 06470; Wendy S. Coren, 10 Brick School Dr., West Redding, CT (US) 06896; David V. Lundquist, 704 E. McLoud Ave., Eagle Lake, FL (US) 33839

( * ) Notice: Subject to any disclaimer, the term of this patent is extended or adjusted under 35 U.S.C. 154(b) by 154 days.

(21) Appl. No.: 09/738,487

(22) Filed: Sep. 26, 2000

Related U.S. Application Data
(60) Provisional application No. 60/156,215, filed on Sep. 27, 1999.

(51) Int. Cl.[7] .................................................. A61B 5/00
(52) U.S. Cl. ....................................................... 600/300
(58) Field of Search ................................ 600/300, 301, 600/558, 587; 434/156, 185; 701/300

(56) References Cited

U.S. PATENT DOCUMENTS

| | | | | |
|---|---|---|---|---|
| 5,596,994 A | * | 1/1997 | Bro | 128/732 |
| 5,885,083 A | * | 3/1999 | Ferrell | 434/156 |
| 5,991,693 A | * | 11/1999 | Zalewski | 701/300 |

* cited by examiner

Primary Examiner—Max F. Hindenburg
(74) Attorney, Agent, or Firm—Martin Novack

(57) ABSTRACT

A method for interactive training of a user, includes the following steps: providing one or more stimulus/response training modules for user selection, each of the modules comprising a sequence of several stimulus/response sessions; for a selected module, scheduling the sessions at time intervals; for each of the sessions, implementing a sequence of one or more incidents, each incident comprising presenting to the user a visual and/or audio stimulus requiring a verbose response; evaluating each response for acceptability, and informing the user of any unacceptable response; and terminating a module when the scheduled sessions have been performed.

19 Claims, 3 Drawing Sheets

STIMULUS-RESPONSE CONDITIONING PROCESS

RELATED APPLICATION

The present application claims priority from U.S. Provisional Patent Application No. 60/156,215 filed Sep. 27, 1999, and said U.S. Provisional Patent Application is incorporated herein by reference.

FIELD OF THE INVENTION

This invention relates to training of a user and, more particularly, to an interactive training method that employs an automated stimulus-response conditioning process.

BACKGROUND OF THE INVENTION

Systems and methods have been developed in the past which utilize interactive computer-based and telecommunications-based techniques for one or more of the following: training, conditioning, control of biofeedback stimulation, monitoring of behavior, and influencing of guided physiological responses. Examples of such techniques can be found in U.S. Pat. Nos. 5,143,081, 5,267,942, 5,377,258, 5,596,994, 5,676,138, 5,694,939, 5,722,418, 5,765,135, 5,792,047 and 5,836,304.

Prior art techniques, however, have lacked the ability to achieve user conditioning that is highly effective in changing user behavior, has lasting effect, is minimally intrusive to the normal activities of the user, and is sufficiently inexpensive for use by individuals and organizations with limited resources.

It is among the objects of the present invention to provide an interactive training method that provides automated stimulus-responses conditioning processes that overcome the drawbacks and limitations of prior art techniques.

SUMMARY OF THE INVENTION

The automated stimulus-response conditioning process of the present invention makes use of the concept that people develop patterns of behavior based upon input from their five senses. In most day-to-day life, only the senses of sight, hearing and touch are relevant when dealing with others. (Smell and taste are also very important, yet are not as important when dealing with others during normal interactions.) The more a given stimulate-response pattern occurs, the more it is anticipated in the future—to the point where even the hint of the pattern can induce significant response.

Pavlov discovered that he could condition a response in dogs by repeatedly linking an arbitrary stimulus (the ringing of a bell), with a desired outcome (food). Furthermore, he was able to show that, after a sufficient period of training, even without the desired outcome he could induce profound physiological changes (salivation) in his subjects simply by applying the artificial stimulus. The key to his success was the consistent repetition of a stimulus-response pattern over a period of time. This pattern conditioned his subjects to initiate their response every time the stimulus was fired.

People encounter new patterns every day. Many of them are assimilated and associated with the mental and/or physiological state that the person was in at the instant of the encounter. In order for the pattern to manifest in a variety of states, it must be imprinted in as many states as possible. Once the pattern has been imprinted enough times and in enough states, the neurological pathways are set to facilitate the pattern in these states as well as in other similar states. The pattern becomes the dominant response to a given stimulus. Thus, it is through the cumulative effect of repetitive imprinting of a pattern while the subject is in a variety of states that the pattern becomes dominant.

Patterns which cause intense stress (or which are encountered when subjects are under intense stress) are imprinted very quickly, despite the lack of repetition. However, the imprint will be associated with a narrower range of states than is accomplished via repetition. Note here that stress simply refers to a heightened physiological state. There are two types of stress: eu-stress, which is associated with pleasurable experiences, and dis-stress, which is associated with unpleasant experiences.

Many teaching methods attempt to induce a desired "learning state". It is believed that content retention can be enhanced if students are in certain states. While this may result in very successful imprinting of the material in that state, subjects often find the material to be difficult to apply at other times.

In order to effectively imprint a pattern while a subject is in a variety of states, the stimulus-response interaction must be very simple. It should be initiated while the user is in a state which is common for the user, and be able to be completed by the user without inducing the user to change to a learning state.

The present invention applies this concept to training people. Millions of people take training programs and self-help courses. The problem, however, is that most workshops and courses fail to sustain behavioral change. The vast majority of people who attend seminars and workshops lose most of what they have learned within a few months. The key here is the lack of consistent reinforcement after the initial learning. Behavioral patterns are imprinted in two ways: (a) under stress; and (b) through repetition. Since most people are under little stress when attending a seminar (in fact, seminars are designed to be low-stress), and most seminars have little, if any, follow-up reinforcement, the chances of the material being truly integrated are slim.

In accordance with a form of the invention, there is set forth a method for interactive training of a user, comprising the following steps: providing one or more stimulus/response training modules for user selection, each of the modules comprising a sequence of several stimulus/response sessions; for a selected module, scheduling the sessions at time intervals; for each of the sessions, implementing a sequence of one or more incidents, each incident comprising presenting to the user a visual and/or audio stimulus requiring a verbose response; evaluating each response for acceptability, and informing the user of any unacceptable response; and terminating a module when the scheduled sessions have been performed.

In an embodiment of this form of the invention, the method further comprises providing a system that includes: a processor subsystem with memory and clock functions, at least one medium coupled with the processor subsystem for presenting stimuli to a user and at least one medium coupled with the processor subsystem for receiving responses from the user; and including the step of programming the processor subsystem to perform the interactive training method. In this embodiment, the step of providing a system that includes at least one medium for presenting stimuli to a user comprises providing a system that includes a video and/or audio output, and the step of providing a system that includes at least one medium for receiving responses from a user comprises providing a system that includes a tactile and/or speech activated input. Also in this embodiment, the step of providing a plurality of training modules comprises providing training modules that include at least ten stimulus/response sessions, at least several of the sessions being repetitive. The sessions are preferably spaced apart in time by intervals of at least one hour, and each of the sessions is preferably performable within about two minutes.

Further features and advantages of the invention will become more readily apparent from the following detailed description when taken in conjunction with the accompanying drawings.

DETAILED DESCRIPTION

Figure 1:
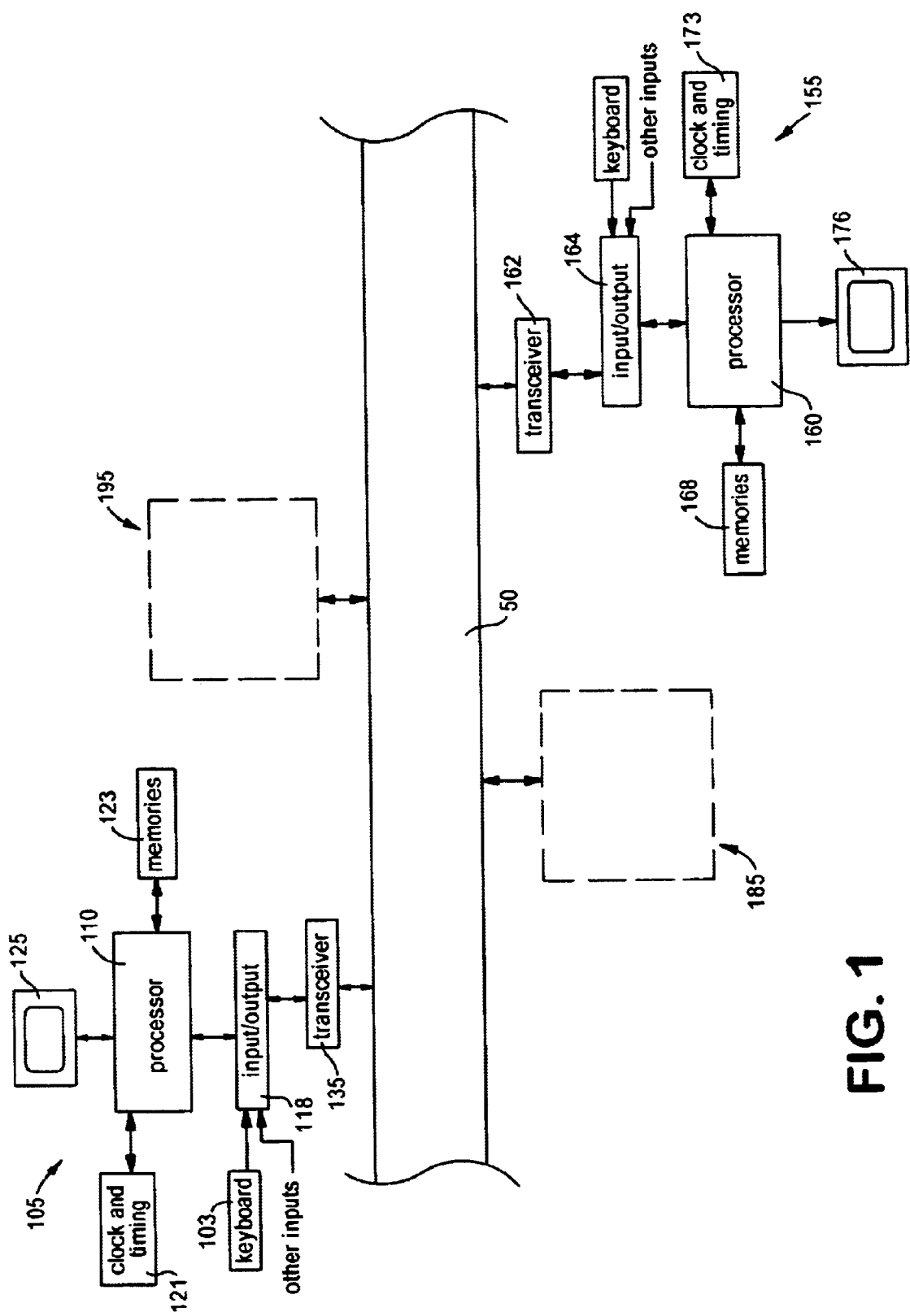
FIG. 1 is a block diagram of a system that can be used in practicing embodiments of the invention.

FIG. 1 is a block diagram of a system that can be used in practicing embodiments of the invention. A number of processor-based subsystems, represented at 105, 155, 185, and 195, are shown as being in communication over a channel or network 50, which may be, for example, any wired, optical, and/or wireless communication channel such as a telephone or internet communication channel or network. In the present example, the subsystem 105 is the subsystem being used by a user being trained at a particular training session. The subsystem 105 can comprise, for example, a personal computer, a hand-held personal organizer, or any other suitable device or subsystem. The software and control can be resident in the subsystem 105 itself (in which case, connection with the channel 50 may be unnecessary) or can be resident elsewhere, e.g. in processor-based subsystem 155 coupled with the channel 50. The processor-based system 155 may be, for example, part of a website that provides the software and/or control to processor-based subsystems 105, 185, 195, etc. The subsystem 105 includes processor 110 and the subsystem 155 includes processor 160. When programmed in the manner to be described, the processors 110 and/or 160 and their associated circuits can be used to practice embodiments of the invention. The processors 110 and 160 may each be any suitable processor, for example an electronic digital processor or microprocessor. It will be understood that any general purpose or special purpose processor, or other machine or circuitry that can perform the functions described herein, electronically, or by other means, can be utilized. The processors may be, for example, Intel Pentium processors. The subsystem 105 may typically include memories 123, clock and timing circuitry 121, input/output functions 118, and monitor 125, which may all be of conventional types. Inputs can include a keyboard input as represented at 103 and any other suitable input. Communication is via transceiver 135, which may comprise a modem, high speed coupler, or any suitable device for communicating signals. The subsystem 155 in this illustrative system can have a similar configuration to that of subsystem 105. The processor 160 has associated input/output circuitry 164, memories 168, clock and timing circuitry 173, and a monitor 176. Inputs include a keyboard 163 and any other suitable input. Communication of subsystem 155 with the outside world is via transceiver 162 which, again, may comprise any suitable device for communicating signals. It will be understood that the processing and communications media that are described are exemplary, and that the invention can have application in other settings.

Applicant's research has shown that behavior pattern changes can be induced via very simplistic reinforcement exercises, provided that the reinforcement follows certain guidelines. A key aspect is to provide a pattern of reinforcement over a period of time until the subject begins to internalize the new behavior. In an embodiment hereof, three types of exercises are used to accomplish this as follows:

The first method is to consistently repeat something many times (e.g., if you tell someone every day at lunch to "drink water" and they repeat the phrase "drink water" after hearing it, after a few weeks they will naturally think, "drink water", at lunchtime). This method is called "stimulus-repeat".

The second method is to consistently correct an undesirable habit by stating the correct action when the incorrect one is performed, such as restating an objection to use "and" instead of "but". This method is called "stimulus-correct".

The third method is to provide a stimulus that states a question, a problem, or a situation, which requires an independent reply (the answer, a solution, another question, etc) as the correct response. This method is called "stimulus-reply".

These three stimulus-response patterns may be mixed throughout training session depending upon the material being trained. Specific desired behavior can be achieved through simple stimulus-repeat exercises. Thought process changes require stimulus-correct or stimulus-reply exercises.

The training routine used in an embodiment of the invention is designed to take a very specific desired behavior and imprint it over a period of time using repetitive stimulus-response exercises. A training module hereof typically consists of 50–150 or so very quick exercises on a given topic. For example, every few hours over the span of 1–4 weeks, the user is prompted with a stimulus to which they must respond. The stimulus should involve more than one sense. For example, the user can be shown something on a display, and a sound file can be played to the user. Next, the user must respond to this stimulus by, for example, typing something in on the keyboard, or speaking to a speech recognition module of the processor subsystem. Based upon the purpose of the exercise, the desired response may be either: (a) repeating the stimulus (stimulus-repeat); or (b) providing a corrected version of the stimulus (stimulus-correct); or (c) providing an appropriate answer to the stimulus (stimulus-reply). This step is important because, in what has become a very passive culture, having information presented without requiring a response generally results in very low recall. The simple act of typing in a response requires that the user process the information along the way. After a couple of days, the user will become proficient at responding. After a week or so, the user will begin to integrate the software-induced response into similar circumstances in the user's life. After about two weeks, the pattern will have taken hold enough that the user will naturally respond in the desired manner when a similar real-world stimulus occurs.

Training can be used for a myriad of topics: from learning to use certain speech patterns in order to communicate more efficiently, to developing certain automatic responses to stressful situations. Any material that can be simplified into stimulus-response exercises can be imprinted in this manner.

The following describes the processes involved in stimulus-response conditioning hereof. First, definitions are set forth:

"Topic": a desired set of stimulus-response patterns to be conditioned. A topic can range from a very specific outcome (such as quitting smoking), to a more general outcome (such as using positive language patterns).

"Module": a specific pattern to be conditioned. Topics may require one or more modules to complete the conditioning.

"Exercise": A very brief interactive stimulus response session.

"Incident": An instance of an exercise. A module consists of many incidents—each may be a separate exercise, or they may all be the same exercise.

Figure 2:
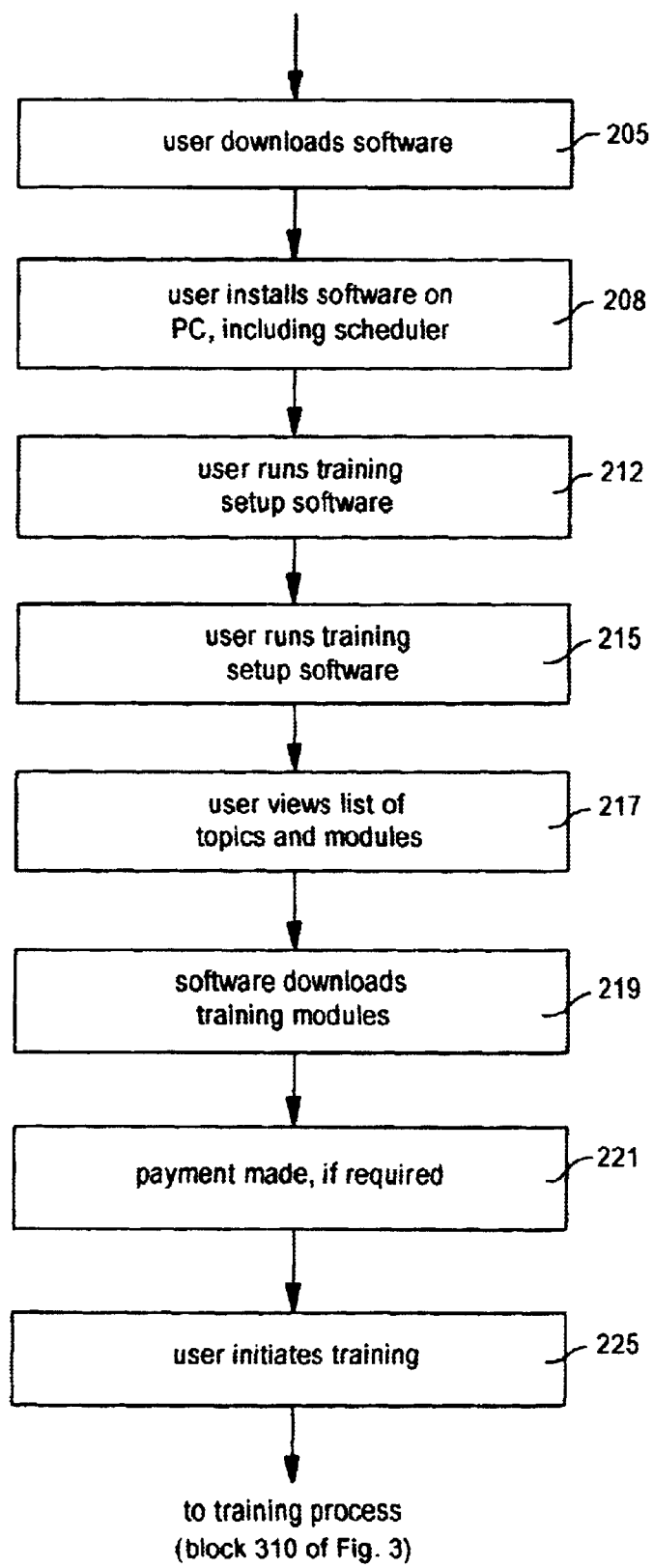
FIG. 2 is a flow diagram of a routine that can be used in programming a processor for practicing embodiments of the invention.
Figure 3:
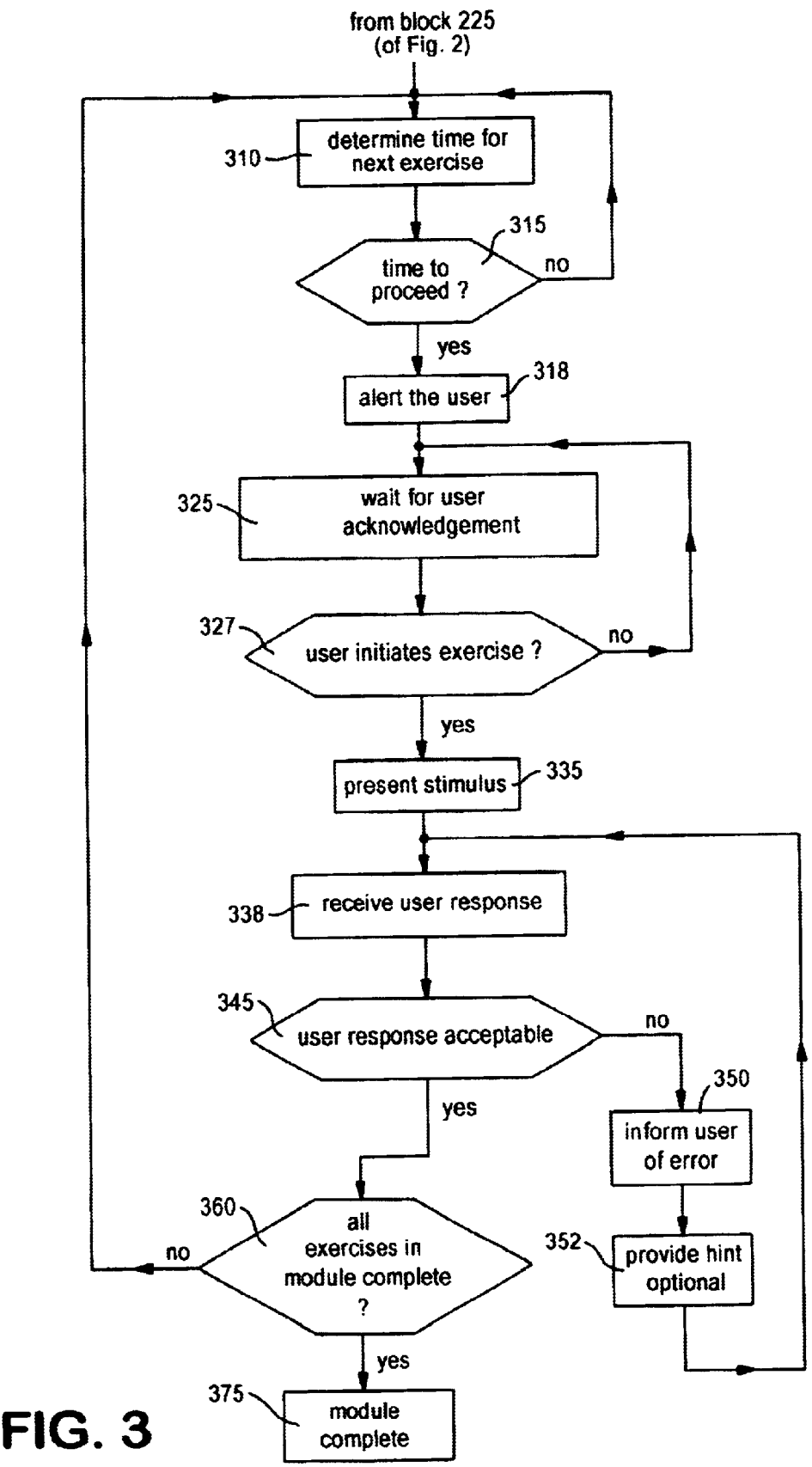
FIG. 3 is a flow diagram of a further portion of the FIG. 2 flow diagram.

FIGS. 2 and 3 show flow diagrams of routines suitable for controlling a processor or processors (e.g. in FIG. 1) in accordance with an embodiment of the invention. FIG. 2 illustrates the routine for the topic/module selection process. The user downloads the training software, such as from a web site or a mass storage media (MSM), such as a CD-ROM (block 205). In this example, the user installs the training software on their local PC (block 208). The installation will include setting up a scheduling program that will load automatically each time the PC is initialized. This scheduler is used to control the timing and initiation of training exercises. The user runs the training setup software (which may be imbedded in the training software) to view a list of available topics and modules (blocks 212 and 215). This list is taken either from an MSM, or via a web site whose URL (universal resource locator) is encoded in the training software. The user selects a topic for training, and then selects a specific module to be run (block 217). For example, a user might select the topic "Communication Skills", and then the module "Ask for what you want". The training software then downloads the module from the MSM or web site, and installs the module (block 219). If payment is required, the user will be prompted either for credit card information, or for an authorization certificate and password combination (block 221) which would be provided in advance (e.g. for corporate training rollouts). The user can then begins the training process (block 225) via a menu or button selection in the training software.

FIG. 3 illustrates the routine for the training process of the present embodiment of the invention. When the training session begins, the time at which the next lesson may be initiated is determined (block 310) and the scheduling program sets a "wake-up" event for that time. When it is time for a new exercise (decision block 315), the scheduling program launches the training software, which alerts the user (block 318). This can be either very subtle (such as an indicator on the computer's desktop), or more conspicuous (such as a pop-up window that requires the user to interact with it). User acknowledgement is awaited (block 325), and the user initiation of the exercise is awaited (decision block 327). The stimulus is then presented (block 335). The exercise itself should present the stimulus visually and/or via audio. The more senses involved in the stimulus, the more effective the reinforcement will be. Also, the exercise should provide instructions as to how the user is to respond (i.e., stimulus-repeat, stimulus-correct, stimulus-reply). The user must provide a specific response to complete the exercise (block 338). This must be more than simply selecting a button or menu option. The user must "tell" the program something related to the stimulus (i.e., stimulus-repeat, stimulus-correct, stimulus-reply), either via the keyboard or via voice recognition. The input from the user is compared to a template of acceptable responses (decision block 345). If the response is acceptable, the exercise is complete. If the response is incorrect, the user will be informed (block 350) and allowed to re-enter a new response. The exercise cannot be complete without a proper response. However, an optional hint can be provided (block 352). When the exercise is complete, determination is made (decision block 360) as to whether all the exercises in the module have been completed. If so, then the module is complete (block 375). If not, then the block 310 is re-entered, and the training software notifies the scheduling program when the next exercise is due.

Applicant has determined that, preferably, the following parameters and limitations should be followed: (1) To be imprinted, a topic should include at least 10 incidents. (2) Incidents are initiated (user is alerted) based upon the occurrence of events such as: a specific time of day; after a certain amount of time has elapsed since the last one; etc. In any case, at least one hour should elapse between incidents. (3) An exercise should be able to be completed in less than two minutes under normal usage. (4) Verbose input from the user is required (at least two words).

The following examples illustrate stimulus-response exercises that can be used in an embodiment of the invention. Below is a representative sample of typical exercises. Most modules would have at least 25 distinct exercises that may be repeated multiple times. Each module begins with a brief discussion of what the module is designed to imprint; what the stimulus will entail, and what will be expected as a response. In addition to the stimulus, additional instructions and hints may also appear. Hints may include additional examples, key words/phrases, or the actual desired response. If the user responds incorrectly, further hints will be provided until the correct response is received.

Name of module: "Precision Communication"—(stimulus-reply)—The stimulus will entail a vague statement that people often use in conversation. The expected response is to answer the stimulus by asking for specific clarification.

St: That costs too much.
Re: Compared to what?

St: I'll get back to you later.
Re: When specifically?

St: John is so rude!
Re: How specifically?

St: I can't meet you Tuesday.
Re: What prevents you?

St: You never return my phone calls.
Re: Never?

Name of Module: "Ask for what you want"—(stimulus-correct)—The stimulus will be a statement that brings attention to an undesirable outcome as it is directing the recipient away from it. The appropriate response is to provide a correction of the stimulus via a statement that directs the recipient towards the desired outcome.

St: Don't forget to call
Re: Remember to call.

St: Don't look down.
Re: Look up.

St: Don't be afraid.
Re: Be confident.

St: Don't forget your briefcase.
Re: Remember you briefcase.

St : Don't lose your focus.
Re: Stay focused.

Module name: "Reducing conflict"—(stimulus-correct)—
The stimulus will be a statement that negates itself by using the word "but". The proper response rephrases the statement using "and" instead of "but". This has the effect of adding information instead of negating.
St: That's a great idea, but we've tried it before.
Re: That's a great idea, and we've tried it before.

St: Sorry to keep you waiting, but we've been very busy.
Re: Sorry to keep you waiting, we've been very busy.

St: I'm sorry but that's the way it is.
Re: I'm sorry, and that's the way it is.

St: Yes, but I don't have time.
Re: Yes, and I don't have time.

St: You're right, but we don't have the funds.
Re: You're right, and we don't have the funds.

Module name "Reducing guilt"—(stimulus-reply)—The stimulus will be a statement that imposes expectations via the word "should". Some will be in terms of what one might say to one's self or others. Others will be in terms of what others might say. The proper response is to either (a) rephrase committing to a future action; (b) rephrase the expectation as a desire; or (c) request direction.
St: I should have done this earlier.
Re: I will start earlier next time.

St: You should call your brother.
Re: I would like you to call your brother.

St: I should have left for work by now.
Re: In the future I will leave for work on time.

St: I should have written it down.
Re: Next time I will write it down.

St: You should have done that before you left.
Re: What would you like me to do now?

Module name: "Using the same sensory terminology"—(stimulus-reply)—The stimulus will be a question or statement that is phrased in terms of a specific sensory system (i.e., sight, hearing, feeling, etc.). The proper response involves either repeating or answering the stimulus using words representing the same sensory system.
St: Do you see what I'm saying.
Re: I see what you're saying.

St: Is this clear.
Re: It's clear to me.

St: Look at me when I'm talking to you.
Re: I'm looking at you.

St: Do you hear what I'm saying?
Re: I hear you.

St: How do you feel about that?
Re: I feel good.

St: Listen to me when I'm speaking to you.
Re: I'm listening (or I hear you)

The invention has been described with reference to a particular preferred embodiment, but variations within the spirit and scope of the invention will occur to those skilled in the art. For example, it will be understood that other types of systems having, or controlled directly or indirectly by, general purpose or special purpose processor-based equipment can be used in practicing the invention.

What is claimed is:

1. A method for interactive training of a user, comprising the steps of:
   providing a stimulus/response training module that includes a sequence of several stimulus/response sessions, at least some of said sessions being repetitive,
   scheduling said sessions at time intervals;
   for each of said sessions, implementing a sequence of one or more incidents, each incident comprising presenting to the user a visual and/or audio stimulus requiring a verbose response;
   evaluating each response for acceptability, and informing the user of any unacceptable response; and
   terminating the module when the scheduled sessions have been performed.

2. The method as defined by claim 1, wherein said step of providing a training module comprises providing a plurality of stimulus/response training modules for user selection, and wherein each of said modules comprises a sequence of several stimulus/response sessions, and further comprising the step of user selection of a training module.

3. The method as defined by claim 2, further comprising providing a system that includes: a processor subsystem with memory and clock functions, at least one medium coupled with the processor subsystem for presenting stimuli to a user and at least one medium coupled with the processor subsystem for receiving responses from the user; and including the step of programming the processor subsystem to perform the interactive training method.

4. The method as defined by claim 3, wherein said step of providing a system that includes at least one medium for presenting stimuli to a user comprises providing a system that includes a video and/or audio output.

5. The method as defined by claim 4, wherein said step of providing a system that includes at least one medium for receiving responses from a user comprises providing a system that includes a tactile and/or speech activated input.

6. The method as defined by claim 2, wherein said step of providing a plurality of training modules comprises providing training modules that include at least ten stimulus/response sessions.

7. The method as defined by claim 5, wherein said step of providing a plurality of training modules comprises providing training modules that include at least ten stimulus/response sessions.

8. The method as defined by claim 1, wherein said step that includes implementing said incidents by presenting to the user a stimulus comprises presenting a stimulus that requires a verbose response of at least two words.

9. The method as defined by claim 2, wherein said step that includes implementing said incidents by presenting to the user a stimulus comprises presenting a stimulus that requires a verbose response of at least two words.

10. The method as defined by claim 5, wherein said step that includes implementing said incidents by presenting to the user a stimulus comprises presenting a stimulus that requires a verbose response of at least two words.

11. The method as defined by claim 1, wherein said step of scheduling said sessions comprises scheduling sessions spaced apart in time by intervals of at least one hour, and wherein said intervals can be equal or unequal intervals.

12. The method as defined by claim 2, wherein said step of scheduling said sessions comprises scheduling sessions spaced apart in time by intervals of at least one hour, and wherein said intervals can be equal or unequal intervals.

13. The method as defined by claim 5, wherein said step of scheduling said sessions comprises scheduling sessions spaced apart in time by intervals of at least one hour, and wherein said intervals can be equal or unequal intervals.

14. The method as defined by claim 1, wherein said step of evaluating each response and informing the user of an unacceptable response, further comprises presenting the user with a further opportunity for response to the stimulus.

15. The method as defined by claim 14, wherein said step of presenting the user with a further opportunity for response to the stimulus includes the step of presenting a hint to the user.

16. The method as defined by claim 1, wherein the initiation of a session comprises presenting a cue to the user.

17. The method as defined by claim 1, wherein each of said sessions is performable within about two minutes.

18. The method as defined by claim 2, wherein each of said sessions is performable within about two minutes.

19. The method as defined by claim 5, wherein each of said sessions is performable within about two minutes.

* * * * *